(12) United States Patent
Hsu

(10) Patent No.: US 6,902,184 B2
(45) Date of Patent: Jun. 7, 2005

(54) FOLDABLE GARDEN WAGON

(76) Inventor: Shih-Hao Hsu, 58, Ma Yuan West St., Taichung (TW)

( * ) Notice: Subject to any disclaimer, the term of this patent is extended or adjusted under 35 U.S.C. 154(b) by 113 days.

(21) Appl. No.: 10/641,919

(22) Filed: Aug. 12, 2003

(65) Prior Publication Data

US 2005/0035565 A1 Feb. 17, 2005

(51) Int. Cl.⁷ .................................. B62B 1/20
(52) U.S. Cl. ...................... 280/653; 280/47.32; 280/78; 280/652
(58) Field of Search ................ 280/645, 651, 280/652, 653, 654, 47.18, 47.3, 47.31, 47.32, 78, 655, 655.1

(56) References Cited

U.S. PATENT DOCUMENTS

| | | | | |
|---|---|---|---|---|
| 2,494,199 A | * | 1/1950 | Provitola et al. | ........... 280/653 |
| 2,967,058 A | * | 1/1961 | Hoffmann, Jr. | .............. 280/30 |
| 3,826,511 A | * | 7/1974 | Frank | .......................... 280/653 |
| 5,222,757 A | * | 6/1993 | Magyar | ....................... 280/653 |
| 5,433,462 A | * | 7/1995 | Groleau | ........................ 280/38 |
| 5,806,878 A | * | 9/1998 | Mroczka et al. | ............ 280/653 |
| 5,971,410 A | * | 10/1999 | Nichols | .................... 280/47.31 |
| 6,161,850 A | * | 12/2000 | James et al. | ............. 280/47.18 |
| 6,186,523 B1 | * | 2/2001 | Aielli | ....................... 280/47.31 |
| 6,764,093 B2 | * | 7/2004 | Allsop et al. | ................ 280/653 |

* cited by examiner

Primary Examiner—Christopher P. Ellis
Assistant Examiner—Jeff Restifo
(74) Attorney, Agent, or Firm—Alan D. Kamrath; Nikolai & Mersereau, P.A.

(57) ABSTRACT

A foldable garden wagon includes a wheel frame, and two push racks. The wheel frame has two positioning tubes each formed with a locking hole and an arc-shaped guide slot. Each of the two push racks has an insertion portion inserted into a respective one of the two positioning tubes and provided with a spring-biased locking pin detachably locked in the locking hole, and a spring-biased limit pin movably mounted in the arc-shaped guide slot. Thus, the foldable garden wagon can be folded when not in use, so as to reduce of the volume thereof, thereby saving space of storage.

15 Claims, 5 Drawing Sheets

FOLDABLE GARDEN WAGON

BACKGROUND OF THE INVENTION

1. Field of the Invention

The present invention relates to a foldable garden wagon, and more particularly to a foldable garden wagon that can be folded and stored when not in use, so as to reduce of the volume thereof, thereby saving space of storage.

2. Description of the Related Art

A conventional garden wagon comprises a main body having a front end provided with a wheel and a rear end provided with two push rods. The rear end of the main body has a bottom provided with a support rack to co-operate with the wheel, so that the garden wagon is disposed at a horizontal state.

However, the conventional garden wagon has a fixed volume, so that it cannot be folded, thereby increasing space of storage. In addition, the conventional garden wagon cannot be assembled easily and conveniently, so that the user cannot assemble the conventional garden wagon by himself, thereby increasing costs of assembly. Further, the conventional garden wagon cannot be detached, stored and packaged individually, thereby increasing the volume of storage and package, and thereby increasing costs of transportation.

SUMMARY OF THE INVENTION

The primary objective of the present invention is to provide a foldable garden wagon, wherein the support brace of each of the two push racks of the foldable garden wagon can be folded when not in use, so as to reduce of the volume thereof, thereby saving space of storage.

Another objective of the present invention is to provide a foldable garden wagon that can be assembled easily and conveniently, so that the user can assemble the foldable garden wagon by himself, thereby decreasing costs of assembly.

A further objective of the present invention is to provide a foldable garden wagon, wherein all of the parts of the foldable garden wagon can be detached, stored and packaged individually, thereby reducing the volume of storage and package, and thereby decreasing costs of transportation.

In accordance with the present invention, there is provided a foldable garden wagon, comprising a wheel frame, and two push racks, wherein:

the wheel frame has an end provided with two positioning tubes each having an outer side formed with a locking hole and an arc-shaped guide slot;

each of the two push racks is mounted on the end of the wheel frame and has a front end formed with an insertion portion inserted into a respective one of the two positioning tubes of the wheel frame; and the insertion portion of each of the two push racks is provided with a spring-biased locking pin detachably locked in the locking hole of a respective one of the two positioning tubes of the wheel frame, and a spring-biased limit pin movably mounted in the arc-shaped guide slot of a respective one of the two opposite positioning tubes of the wheel frame.

Further benefits and advantages of the present invention will become apparent after a careful reading of the detailed description with appropriate reference to the accompanying drawings.

BRIEF DESCRIPTION OF THE DRAWINGS

FIG. 2A is a partially enlarged view of the foldable garden wagon as shown in FIG. 2;

FIG. 3A is a partially enlarged plan cross-sectional view of the foldable garden wagon as shown in FIG. 3;

DETAILED DESCRIPTION OF THE INVENTION

Figure 1:
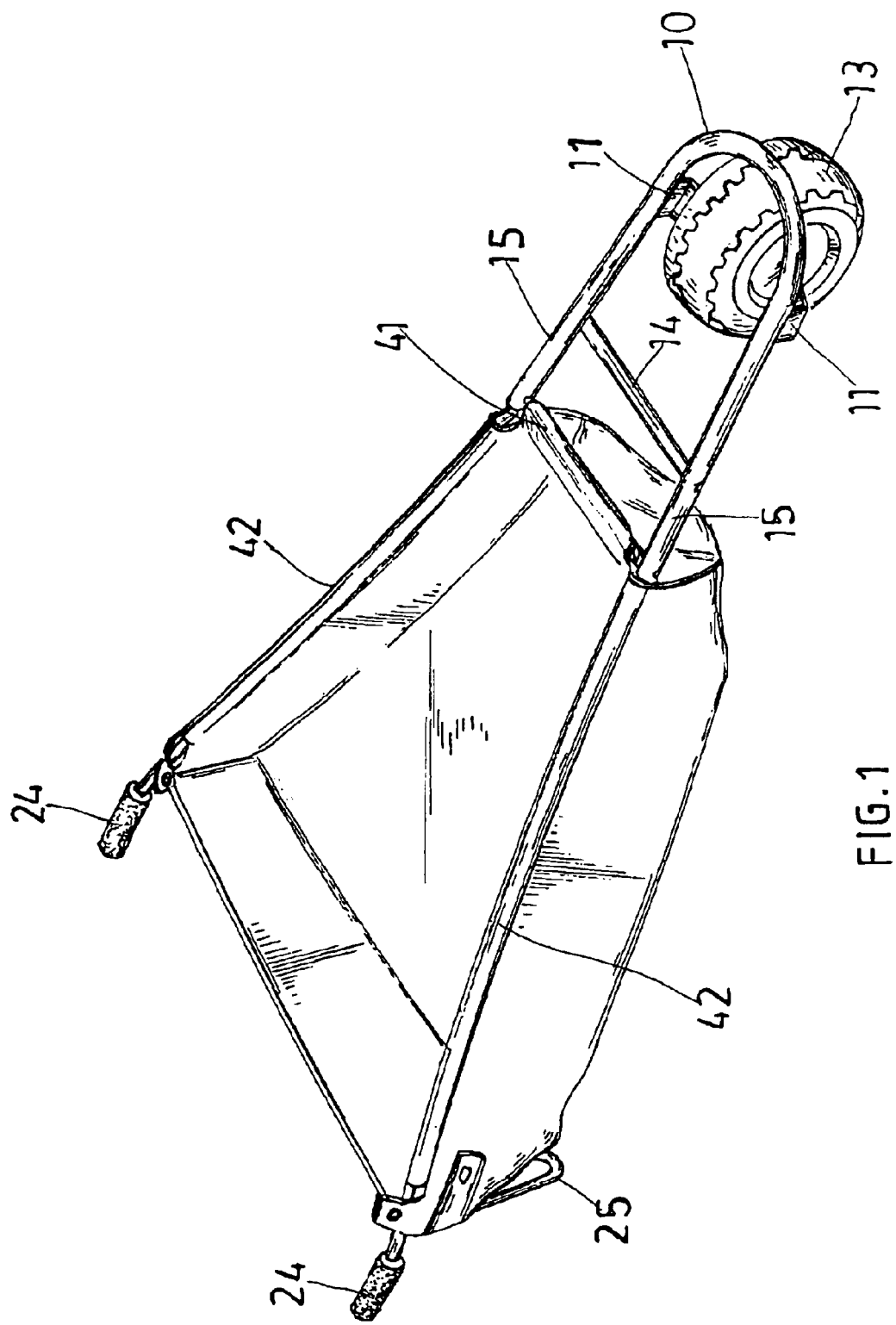
FIG. 1 is a perspective view of a foldable garden wagon in accordance with the preferred embodiment of the present invention.
Figure 2:
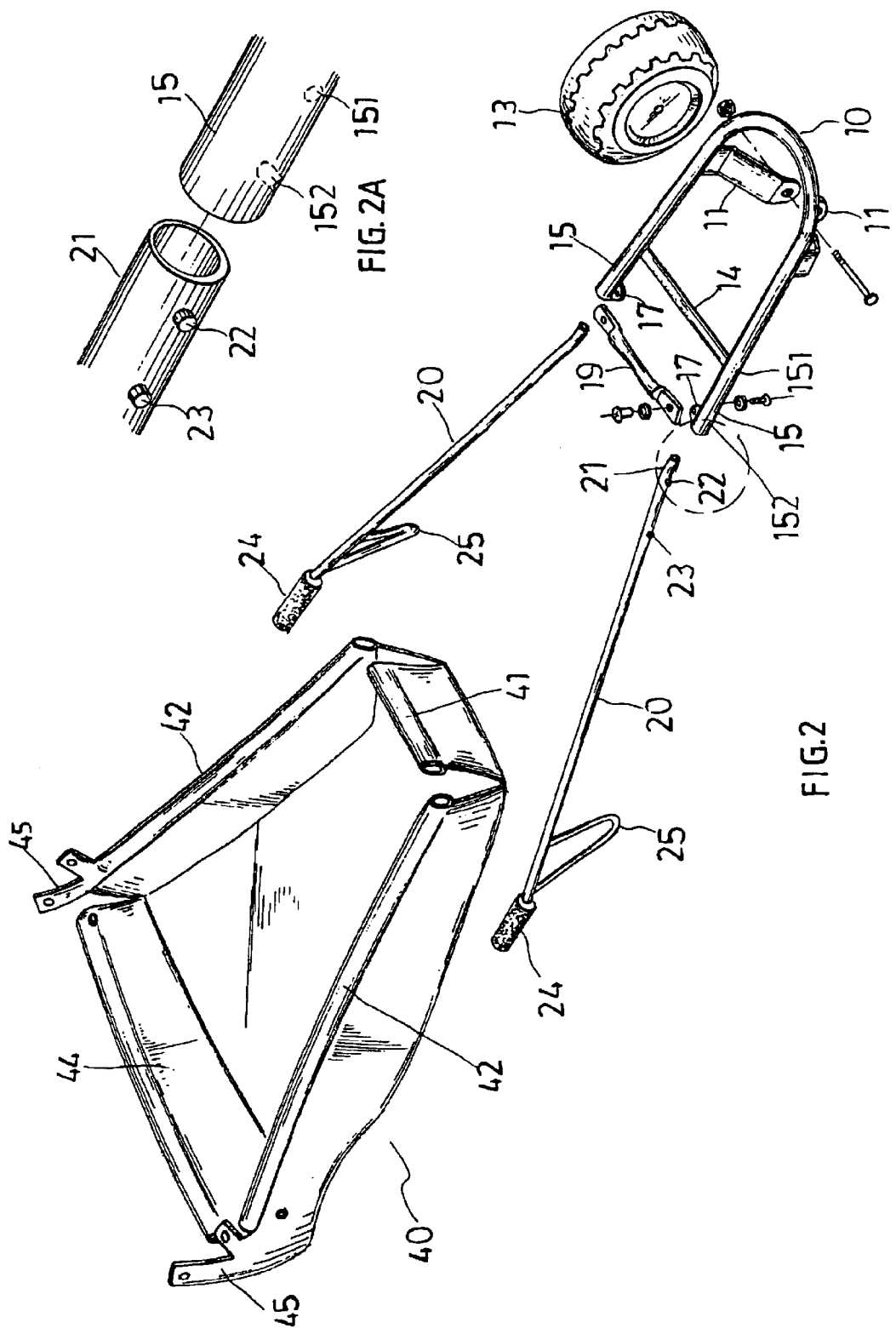
FIG. 2 is an exploded perspective view of the foldable garden wagon as shown in FIG. 1.

Referring to the drawings and initially to FIGS. 1–5, a foldable garden wagon in accordance with the preferred embodiment of the present invention comprises a wheel frame 10, two push racks 20, and a canvas body 40.

The wheel frame 10 is substantially U-shaped, and is made of a metallic tube which is integrally formed by bending. The wheel frame 10 has a front end provided with two opposite pivot plates 11 for pivotally mounting two wheels 13. The wheel frame 10 has a rear end provided with two opposite positioning tubes 15 each having an outer side formed with a locking hole 151 (see FIG. 2A) and an arc-shaped guide slot 152 (see FIG. 2A) spaced from the locking hole 151 and each having an inner side provided with a horizontally arranged combination plate 17. In addition, the arc-shaped guide slots 152 of the two opposite positioning tubes 15 are directed toward different directions. The wheel frame 10 has a mediate portion provided with a transverse rod 14 located between the two opposite positioning tubes 15 to support the two opposite positioning tubes 15.

The wheel frame 10 is provided with a passage bar 19 mounted between the two opposite positioning tubes 15 and having two ends each fixed on the combination plate 17 of a respective one of the two opposite positioning tubes 15 as shown in FIG. 3A.

Figure 4:
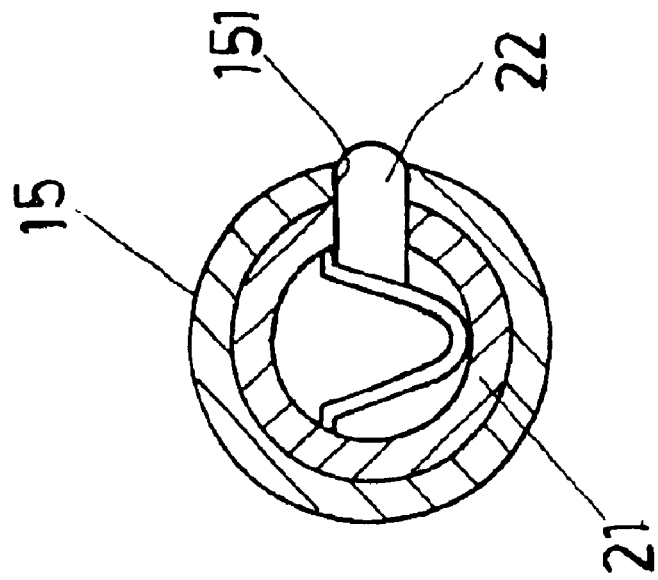
FIG. 4 is a plan cross-sectional view of the foldable garden wagon as shown in FIG. 1.

Each of the two push racks 20 is mounted on the rear end of the wheel frame 10 and is made of a metallic tube which is integrally formed by bending. Each of the two push racks 20 has a front end formed with an insertion portion 21 inserted into a respective one of the two opposite positioning tubes 15 of the wheel frame 10. The insertion portion 21 of each of the two push racks 20 is provided with a spring-biased locking pin 22 detachably locked in the locking hole 151 of a respective one of the two opposite positioning tubes 15 of the wheel frame 10 as shown in FIG. 4, and a spring-biased limit pin 23 movably mounted in the arc-shaped guide slot 152 of a respective one of the two opposite positioning tubes 15 of the wheel frame 10 as shown in FIG. 5.

Figure 5:
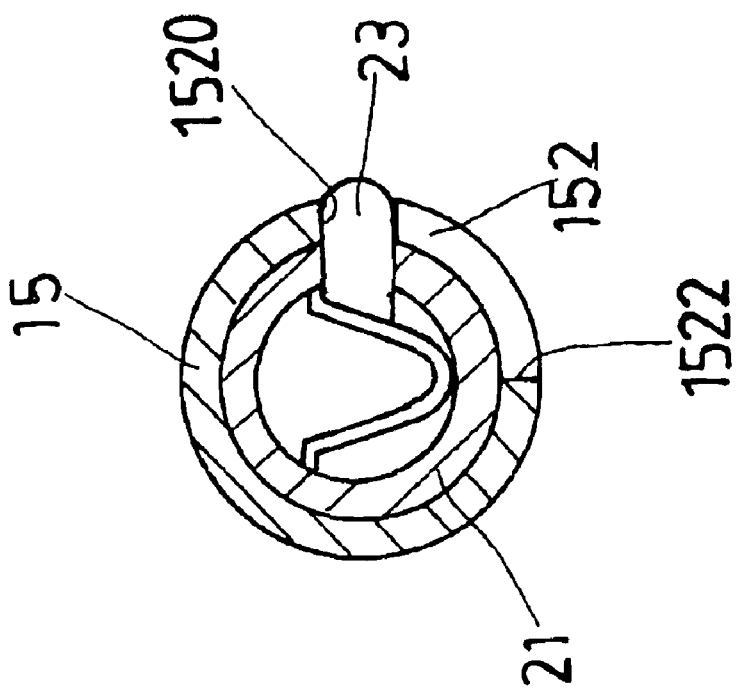
FIG. 5 is a plan cross-sectional view of the foldable garden wagon as shown in FIG. 1.

Preferably, the spring-biased limit pin 23 of the insertion portion 21 of each of the two push racks 20 is limited to move between an upper limit 1520 and a lower limit 1522 of the arc-shaped guide slot 152 of a respective one of the two opposite positioning tubes 15 of the wheel frame 10 as shown in FIG. 5.

Figure 3:
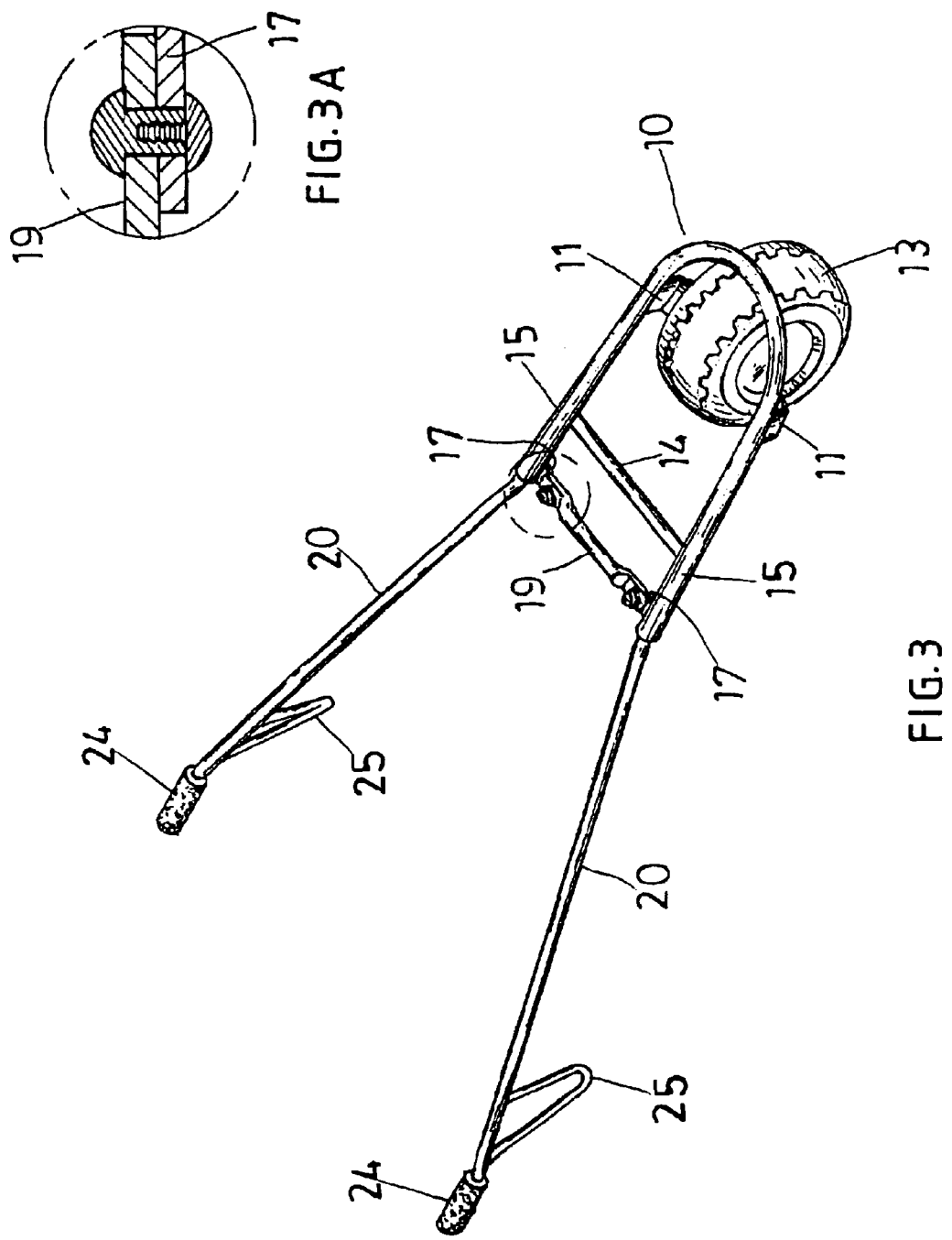
FIG. 3 is a partially perspective view of the foldable garden wagon in accordance with the preferred embodiment of the present invention.
Figure 6:
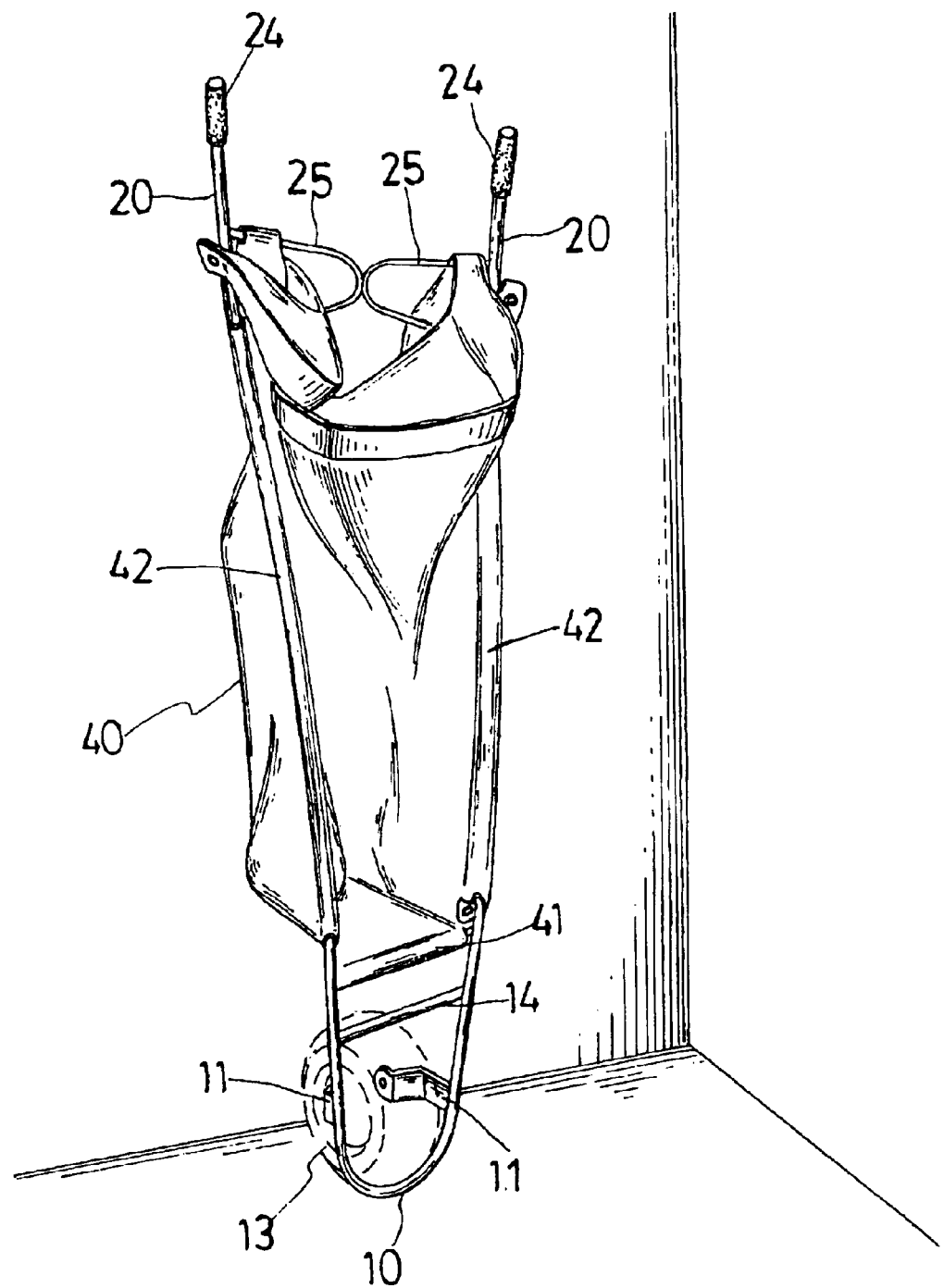
FIG. 6 is a perspective folded view of the foldable garden wagon in accordance with the preferred embodiment of the present invention.

Each of the two push racks 20 has a rear end provided with a handle 24 and a substantially V-shaped support brace 25. When the spring-biased limit pin 23 of the insertion portion 21 of each of the two push racks 20 is rested on the upper limit 1520 of the arc-shaped guide slot 152 of a respective one of the two opposite positioning tubes 15 of the wheel frame 10 as shown in FIG. 5, the support brace 25 of each of the two push racks 20 is arranged at a vertical state as shown in FIG. 3, and when the spring-biased limit pin 23 of the insertion portion 21 of each of the two push racks 20 is rested on the lower limit 1522 of the arc-shaped guide slot 152 of a respective one of the two opposite positioning tubes 15 of the wheel frame 10 as shown in FIG. 5, the support brace 25 of each of the two push racks 20 is arranged at a horizontal state as shown in FIG. 6.

The canvas body 40 is mounted on the two push racks 20 and has a front end provided with a mounting sleeve 41 mounted on the passage bar 19 and located between the two opposite positioning tubes 15 of the wheel frame 10. The canvas body 40 has a rear end provided with a movable shelter 44. The canvas body 40 has two sides each provided with a mounting sleeve 42 mounted on a respective one of the two push racks 20 and each provided with a fastening strap 45 combined with the movable shelter 44.

In assembly, the passage bar 19 is passed through the mounting sleeve 41 of the canvas body 40 and is then fixed on the combination plates 17 between the two opposite positioning tubes 15, so that the canvas body 40 is combined with the wheel frame 10. Then, each of the two push racks 20 is extended through the respective mounting sleeve 42 of the canvas body 40, and the insertion portion 21 of each of the two push racks 20 is inserted into a respective one of the two opposite positioning tubes 15 of the wheel frame 10, so that each of the two push racks 20 is combined with the wheel frame 10.

At this time, the spring-biased locking pin 22 of the insertion portion 21 of each of the two push racks 20 is detachably locked in the locking hole 151 of a respective one of the two opposite positioning tubes 15 of the wheel frame 10 as shown in FIG. 4, and the spring-biased limit pin 23 of the insertion portion 21 of each of the two push racks 20 is movably mounted in the arc-shaped guide slot 152 of a respective one of the two opposite positioning tubes 15 of the wheel frame 10 as shown in FIG. 5. Finally, the movable shelter 44 of the canvas body 40 is fastened by the fastening strap 45, thereby finishing assembly of the foldable garden wagon in accordance with the preferred embodiment of the present invention.

When in use, the spring-biased limit pin 23 of the insertion portion 21 of each of the two push racks 20 is rested on the upper limit 1520 of the arc-shaped guide slot 152 of a respective one of the two opposite positioning tubes 15 of the wheel frame 10 as shown in FIG. 5, so that the support brace 25 of each of the two push racks 20 is arranged at a vertical state as shown in FIG. 3. Thus, the foldable garden wagon can be used as shown in FIG. 1.

When not in use, the spring-biased locking pin 22 of the insertion portion 21 of each of the two push racks 20 is pressed inward to detach from the locking hole 151 of a respective one of the two opposite positioning tubes 15 of the wheel frame 10, so that each of the two push racks 20 can be rotated until the spring-biased limit pin 23 of the insertion portion 21 of each of the two push racks 20 is rested on the lower limit 1522 of the arc-shaped guide slot 152 of a respective one of the two opposite positioning tubes 15 of the wheel frame 10. At this time, the support brace 25 of each of the two push racks 20 is arranged at a horizontal state as shown in FIG. 6, so that the support brace 25 of each of the two push racks 20 can be folded and the foldable garden wagon can be folded and can be rested on the vertical wall as shown in FIG. 6.

Accordingly, the foldable garden wagon can be assembled easily and conveniently, so that the user can assemble the foldable garden wagon by himself, thereby decreasing costs of assembly. In addition, all of the parts of the foldable garden wagon can be detached, stored and packaged individually, thereby reducing the volume of storage and package, and thereby decreasing costs of transportation. Further, the support brace 25 of each of the two push racks 20 of the foldable garden wagon can be folded when not in use, so as to reduce of the volume thereof, thereby saving space of storage.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A foldable garden wagon, comprising a wheel frame, and two push racks, wherein:
   the wheel frame has an end provided with two positioning tubes each having an outer side formed with a locking hole and an arc-shaped guide slot;
   each of the two push racks is mounted on the end of the wheel frame and has a front end formed with an insertion portion inserted into a respective one of the two positioning tubes of the wheel frame; and
   the insertion portion of each of the two push racks is provided with a spring-biased locking pin detachably locked in the locking hole of a respective one of the two positioning tubes of the wheel frame, and a spring-biased limit pin movably mounted in the arc-shaped guide slot of a respective one of the two opposite positioning tubes of the wheel frame.

2. The foldable garden wagon in accordance with claim 1, wherein the spring-biased limit pin of the insertion portion of each of the two push racks is limited to move between an upper limit and a lower limit of the arc-shaped guide slot of a respective one of the two positioning tubes of the wheel frame.

3. The foldable garden wagon in accordance with claim 2, wherein each of the two push racks has a rear end provided with a support brace which is rotated with the spring-biased limit pin of the insertion portion of each of the two push racks.

4. The foldable garden wagon in accordance with claim 3, wherein when the spring-biased limit pin of the insertion portion of each of the two push racks is rested on the upper limit of the arc-shaped guide slot of a respective one of the two positioning tubes of the wheel frame, the support brace of each of the two push racks is arranged at a vertical state.

5. The foldable garden wagon in accordance with claim 3, wherein when the spring-biased limit pin of the insertion portion of each of the two push racks is rested on the lower limit of the arc-shaped guide slot of a respective one of the two positioning tubes of the wheel frame, the support brace of each of the two push racks is arranged at a horizontal state.

6. The foldable garden wagon in accordance with claim 3, wherein the support brace is substantially V-shaped.

7. The foldable garden wagon in accordance with claim 1, wherein the each of the two push racks has a rear end provided with a handle.

8. The foldable garden wagon in accordance with claim 1, wherein the wheel frame is substantially U-shaped.

9. The foldable garden wagon in accordance with claim 1, wherein the arc-shaped guide slots of the two positioning tubes are directed toward different directions.

10. The foldable garden wagon in accordance with claim 1, wherein the wheel frame has a mediate portion provided with a transverse rod located between the two positioning tubes to support the two positioning tubes.

11. The foldable garden wagon in accordance with claim 1, wherein the wheel frame is provided with a passage bar mounted between the two positioning tubes.

12. The foldable garden wagon in accordance with claim 11, wherein each of the two positioning tubes has an inner side provided with a horizontally arranged combination plate, and the passage bar has two ends each fixed on the combination plate of a respective one of the two positioning tubes.

13. The foldable garden wagon in accordance with claim 11, further comprising a canvas body mounted on the two push racks and having a front end provided with a mounting sleeve mounted on the passage bar and located between the two positioning tubes of the wheel frame.

14. The foldable garden wagon in accordance with claim 13, wherein the canvas body has two sides each provided with a mounting sleeve mounted on a respective one of the two push racks.

15. The foldable garden wagon in accordance with claim 1, wherein the canvas body has a rear end provided with a movable shelter and has two sides each provided with a fastening strap combined with the movable shelter.

* * * * *